United States Patent
Barnett et al.

(10) Patent No.: US 6,636,981 B1
(45) Date of Patent: Oct. 21, 2003

(54) METHOD AND SYSTEM FOR END-TO-END PROBLEM DETERMINATION AND FAULT ISOLATION FOR STORAGE AREA NETWORKS

(75) Inventors: Barry Stanley Barnett, Austin, TX (US); Douglas Craig Bossen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/478,306

(22) Filed: Jan. 6, 2000

(51) Int. Cl.$^7$ .................................. G06F 15/177
(52) U.S. Cl. ............................. 714/4; 709/224
(58) Field of Search .................. 714/4; 709/224

(56) References Cited

U.S. PATENT DOCUMENTS

| | | | |
|---|---|---|---|
| 5,832,196 A | * 11/1998 | Croslin et al. ................. | 714/4 |
| 5,835,720 A | * 11/1998 | Nelson et al. ................ | 709/224 |
| 5,841,981 A | * 11/1998 | Kondo ........................ | 709/223 |
| 6,115,361 A | * 9/2000 | Fredericks et al. ........... | 714/25 |
| 6,230,281 B1 | * 5/2001 | Brodfuhrer et al. ........... | 714/4 |
| 6,243,746 B1 | * 6/2001 | Sondur et al. ............... | 709/224 |
| 6,256,740 B1 | * 7/2001 | Muller et al. ................ | 713/201 |
| 6,349,333 B1 | * 2/2002 | Panikatt et al. ............. | 709/224 |
| 6,356,282 B2 | * 3/2002 | Roytman et al. ............ | 709/224 |
| 6,405,248 B1 | * 6/2002 | Wood ......................... | 709/224 |

* cited by examiner

Primary Examiner—Robert Beausoliel
Assistant Examiner—Michael Maskulinski
(74) Attorney, Agent, or Firm—Duke W. Yee; Mark E. McBurney; Lisa L. B. Yociss (57) ABSTRACT

A method and system for problem determination and fault isolation in a storage area network (SAN) is provided. A complex configuration of multi-vendor host systems, FC switches, and storage peripherals are connected in a SAN via a communications architecture (CA). A communications architecture element (CAE) is a network-connected device that has successfully registered with a communications architecture manager (CAM) on a host computer via a network service protocol, and the CAM contains problem determination (PD) functionality for the SAN and maintains a SAN PD information table (SPDIT). The CA comprises all network-connected elements capable of communicating information stored in the SPDIT. The CAM uses a SAN topology map and the SPDIT are used to create a SAN diagnostic table (SDT). A failing component in a particular device may generate errors that cause devices along the same network connection path to generate errors. As the CAM receives error packets or error messages, the errors are stored in the SDT, and each error is analyzed by temporally and spatially comparing the error with other errors in the SDT. If a CAE is determined to be a candidate for generating the error, then the CAE is reported for replacement if possible.

28 Claims, 7 Drawing Sheets

| | | CAE A | CAE B | CAE C |
|---|---|---|---|---|
| ROW 1 | CAE A | POSTED ERROR FOR CAE A IN-BAND LINK TIMEOUT 1/1/99@2:00.55 | | (PATH A→C) = (1→3) |
| ROW 2 | CAE B | | POSTED ERROR FOR CAE B | (PATH B→C) = (2→3) |
| ROW 3 | CAE C | (PATH C→A) = (3→1) | (PATH C→B) = (2→3) | POSTED ERROR FOR CAE C OUT-OF-BAND CONTROLLER FAULT 1/1/99@2:00.01 |
| ROW 4 | SWITCH CAE 1 | POSTED ERROR FOR CAE 1 | | |
| ROW 5 | SWITCH CAE 2 | | POSTED ERROR FOR CAE 2 IN-BAND LINK ERROR 1/2/99@4:55.09 | |
| ROW 6 | SWITCH CAE 3 | | | POSTED ERROR FOR CAE 3 |

| | VENDOR | PRODUCT | INFO TYPE | DESCRIPTION |
|---|---|---|---|---|
| | FC SWITCH CORPORATION | 16 F_PORT FC SWITCH, MODEL 123 ProdID=1 | IN-BAND: FC LINK, FC EXTENDED LINK SERVICES: REGISTERED LINK INCIDENT RECORD | ELS RLIR COMPATIBLE |
| | ooo | ooo | ooo | ooo |
| | FC STORAGE CORPORATION | 4-PORT FC RAID MODEL 234 ProdID=2 | OUT-OF-BAND: SNMP MIB IN-BAND: FC LINK EXTENDED LINK RLIR | MIB=FCSTORINC ELS RLIR COMPATIBLE |

| | CAE A | CAE B | CAE C |
|---|---|---|---|
| CAE A | SPDIT/TYPE INFORMATION SWITCH PORT CAE 1 | (PATH A→B) = (1→2) PATH NOT USED | (PATH A→C) = (1→3) |
| CAE B | (PATH B→A) = (2→1) PATH NOT USED | SPDIT/TYPE INFORMATION SWITCH PORT CAE 2 | (PATH B→C) = (2→3) |
| CAE C | (PATH C→A) = (3→1) | (PATH C→B) = (3→2) | SPIDT/TYPE INFORMATION SWITCH PORT CAE 3 |

|  |  | CAE A | CAE B | CAE C |
|---|---|---|---|---|
| ROW 1 | CAE A | POSTED ERROR FOR CAE A IN-BAND LINK TIMEOUT 1/1/99@2:00.55 |  | (PATH A→C) = (1→3) |
| ROW 2 | CAE B |  | POSTED ERROR FOR CAE B | (PATH B→C) = (2→3) |
| ROW 3 | CAE C | (PATH C→A) = (3→1) | (PATH C→B) = (2→3) | POSTED ERROR FOR CAE C OUT-OF-BAND CONTROLLER FAULT 1/1/99@2:00.01 |
| ROW 4 | SWITCH CAE 1 | POSTED ERROR FOR CAE 1 |  |  |
| ROW 5 | SWITCH CAE 2 |  | POSTED ERROR FOR CAE 2 IN-BAND LINK ERROR 1/2/99@4:55.09 |  |
| ROW 6 | SWITCH CAE 3 |  |  | POSTED ERROR FOR CAE 3 |

*FIG 7*

| WEIGHTINGS FOR DEVICE ERRORS | WEIGHTINGS FOR LINK ERRORS |
|---|---|
| CONTROLLER HARDWARE FAILURE = H | LINK HARDWARE NON-OPERATIONAL (SWITCH/N/L) = H |
| DEVICE HARDWARE FAILURE = H | LINK HARDWARE FAILURE RECOVERABLE = M |
| DEVICE HARDWARE ERROR RECOVERABLE = H | LINK TIMEOUT ERROR = L |
| DEVICE TIMEOUT = M | LINK HARDWARE DEGRADED = H |
| CONTROLLER TIMEOUT = M | POWER HARDWARE FAULT = H |
| POWER HARDWARE FAULT = H |  |

METHOD AND SYSTEM FOR END-TO-END PROBLEM DETERMINATION AND FAULT ISOLATION FOR STORAGE AREA NETWORKS

BACKGROUND OF THE INVENTION

1. Technical Field

The present invention relates to an improved data processing system and, in particular, to a method and apparatus for computer network managing.

2. Description of Related Art

A Storage Area Network (SAN) is an "open system" storage architecture that allows multiple host computers to share multiple storage peripherals, and in particular, to share storage peripherals via a Fibre Channel (FC) network switch. The FC switch, host systems, and storage peripherals may be manufactured by different vendors and contain different operating environments.

Currently, there is a lack of an end-to-end problem determination capability or specification for an FC SAN. A complex configuration of multi-vendor systems, network switches, and peripherals makes it significantly more difficult to perform problem determination in a SAN environment than existing point-to-point storage configurations. As a result, failures in a SAN environment will cause an increase of system downtime as well as increasing cost of system maintenance.

It would be advantageous to have a method and apparatus that defines an "open system", real-time, end-to-end, error detection architecture that incorporates fault isolation algorithms to identify failing systems and/or components connected to a SAN.

SUMMARY OF THE INVENTION

A method and system for problem determination and fault isolation in a storage area network (SAN) is provided. A complex configuration of multi-vendor host systems, FC switches, and storage peripherals are connected in a SAN via a communications architecture (CA). A communications architecture element (CAE) is a network-connected device that has successfully registered with a communications architecture manager (CAM) on a host computer via a network service protocol, and the CAM contains problem determination (PD) functionality for the SAN and maintains a SAN PD information table (SPDIT). The CA comprises all network-connected elements capable of communicating information stored in the SPDIT. The CAM uses a SAN topology map and the SPDIT are used to create a SAN diagnostic table (SDT). A failing component in a particular device may generate errors that cause devices along the same network connection path to generate errors. As the CAM receives error packets or error messages, the errors are stored in the SDT, and each error is analyzed by temporally and spatially comparing the error with other errors in the SDT. If a CAE is determined to be a candidate for generating the error, then the CAE is reported for replacement if possible.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figures 1, 2:
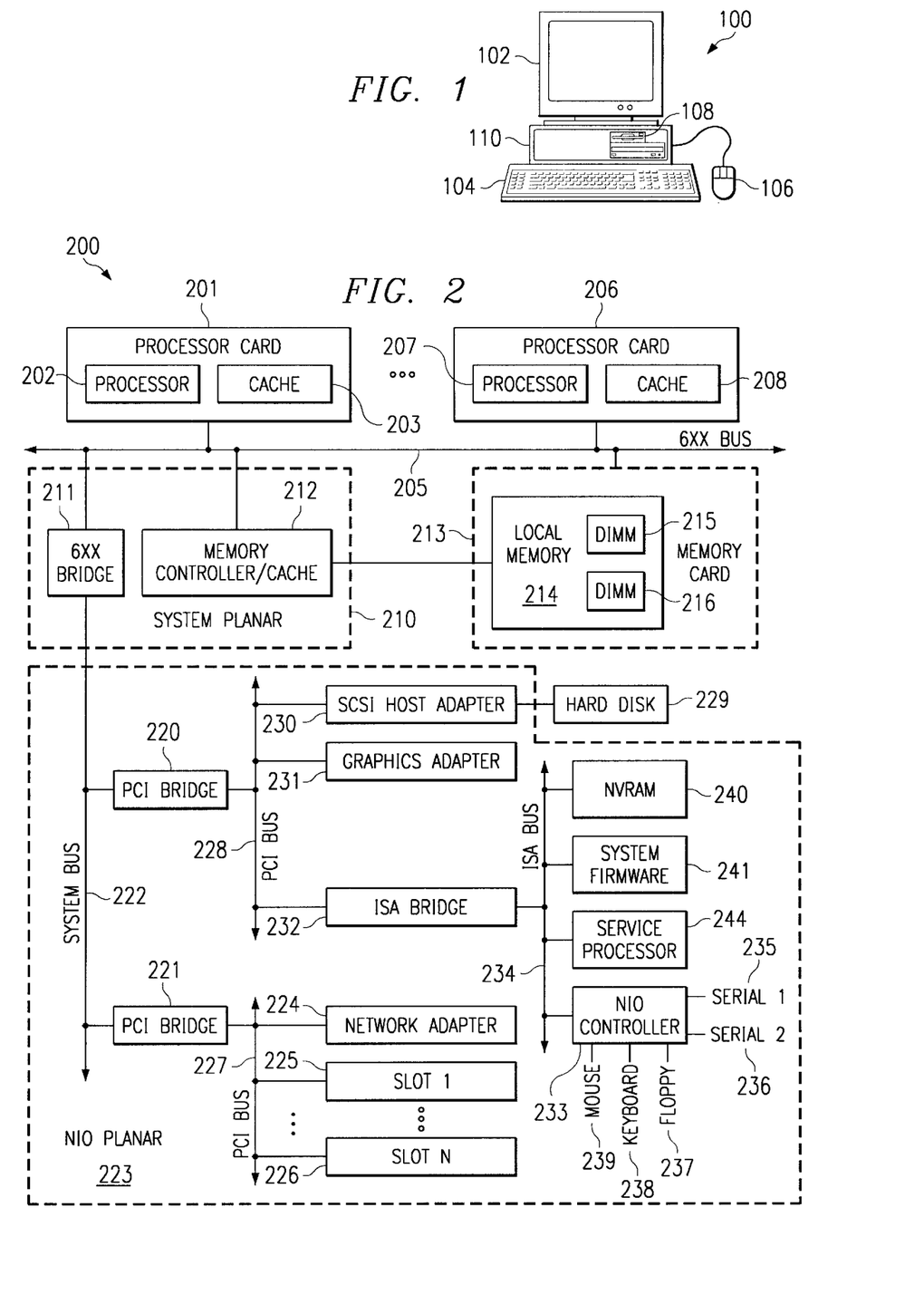
FIG. 1 is a pictorial representation depicting a data processing system in which the present invention may be implemented.
FIG. 2 is an example block diagram illustrating internal components of a server-type data processing system that may implement the present invention.

With reference now to FIG. 1, a pictorial representation depicts a data processing system in which the present invention may be implemented. A computer 100 is depicted, which includes a system unit 110, a video display terminal 102, a keyboard 104, storage devices 108, which may include floppy drives and other types of permanent and removable storage media, and mouse 106. Additional input devices may be included with computer 100. Computer 100 can be implemented using any suitable computer, for example, an IBM RISC/System 6000 system, a product of International Business Machines Corporation in Armonk, N.Y., running the Advanced Interactive Executive (AIX) operating system, also a product of IBM. Although the depicted representation shows a server-type computer, other embodiments of the present invention may be implemented in other types of data processing systems, such as workstations, network computers, Web-based television set-top boxes, Internet appliances, etc. Computer 100 also preferably includes a graphical user interface that may be implemented by means of system software residing in computer readable media in operation within computer 100.

FIG. 1 is intended as an example and not as an architectural limitation for the present invention.

With reference now to FIG. 2, a block diagram depicts a typical organization of internal components in a data processing system. Data processing system 200 employs a variety of bus structures and protocols. Although the depicted example employs a PCI bus, an ISA bus, and a 6XX bus, other bus architectures and protocols may be used.

Processor card 201 contains processor 202 and L2 cache 203 that are connected to 6XX bus 205. System 200 may contain a plurality of processor cards. Processor card 206 contains processor 207 and L2 cache 208.

6XX bus 205 supports system planar 210 that contains 6XX bridge 211 and memory controller 212 that supports memory card 213. Memory card 213 contains local memory 214 consisting of a plurality of dual in-line memory modules (DIMMs) 215 and 216.

6XX bridge 211 connects to PCI bridges 220 and 221 via system bus 222. PCI bridges 220 and 221 are contained on native I/O (NIO) planar 223 which supports a variety of I/O components and interfaces. PCI bridge 221 provides connections for external data streams through network adapter 224 and a number of card slots 225–226 via PCI bus 227. PCI bridge 220 connects a variety of I/O devices via PCI bus 228. Hard disk 229 may be connected to SCSI host adapter 230, which is connected to PCI bus 228. Graphics adapter 231 may also be connected to PCI bus 228 as depicted, either directly or indirectly.

ISA bridge 232 connects to PCI bridge 220 via PCI bus 228. ISA bridge 232 provides interconnection capabilities through NIO controller 233 via ISA bus 234, such as serial connections 235 and 236. Floppy drive connection 237 provides removable storage. Keyboard connection 238 and mouse connection 239 allow data processing system 200 to accept input data from a user. Non-volatile RAM (NVRAM) 240 provides non-volatile memory for preserving certain types of data from system disruptions or system failures, such as power supply problems. System firmware 241 is also connected to ISA bus 234 and controls the initial BIOS. Service processor 244 is connected to ISA bus 234 and provides functionality for system diagnostics or system servicing.

Service processor 244 detects errors and passes information to the operating system. The source of the errors may or may not be known to a reasonable certainty at the time that the error is detected. The operating system may merely log the errors or may otherwise process reported errors.

Those of ordinary skill in the art will appreciate that the hardware in FIG. 2 may vary depending on the system implementation. For example, the system may have more processors, and other peripheral devices may be used in addition to or in place of the hardware depicted in FIG. 2. The depicted examples are not meant to imply architectural limitations with respect to the present invention.

Figure 3:
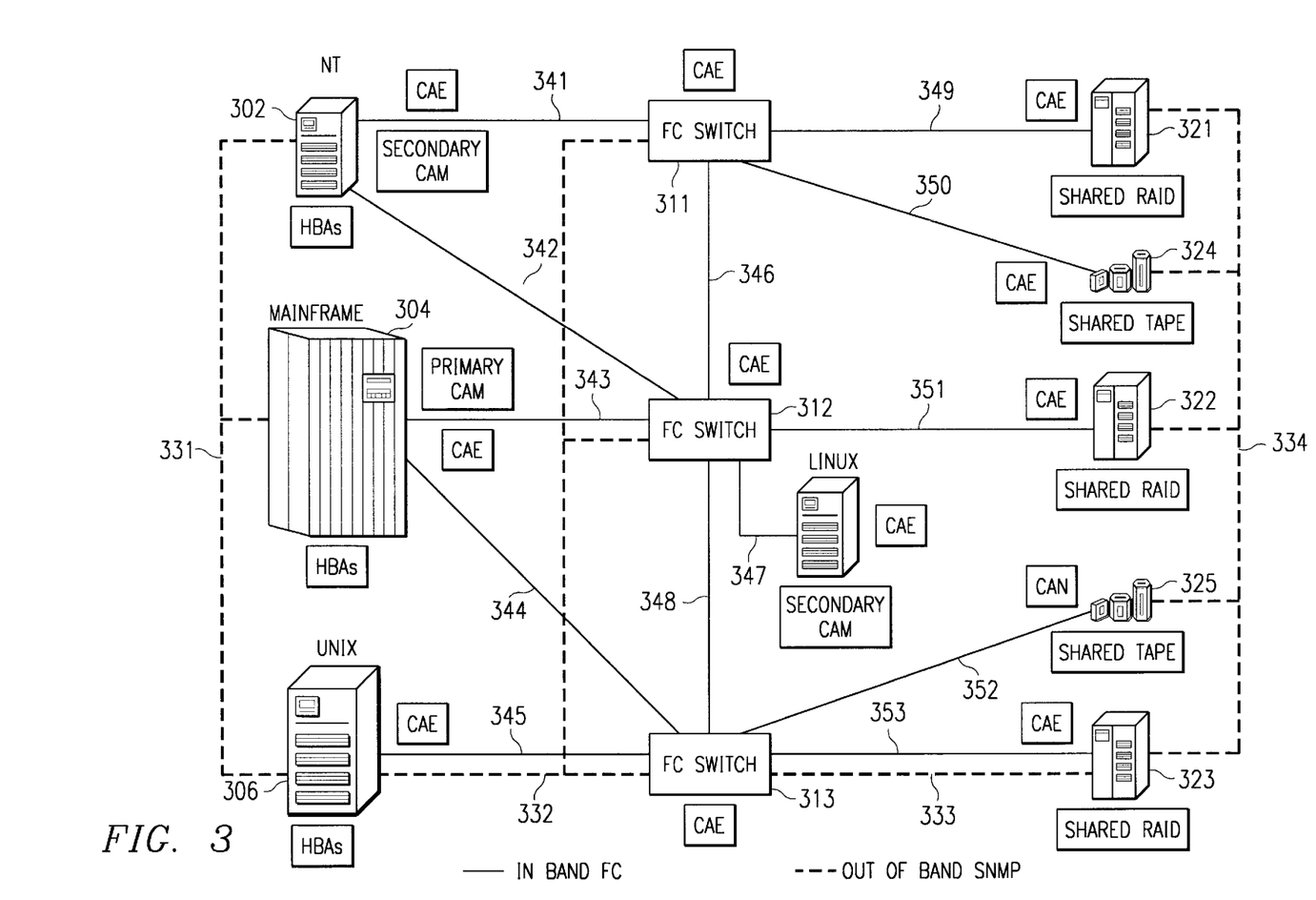
FIG. 3 is a diagram depicting a communications architecture for data processing systems that participate in the SAN problem determination methodology implemented in accordance with a preferred embodiment of the present invention.

With reference now to FIG. 3, a diagram depicts a communications architecture for data processing systems that participate in the SAN problem determination methodology implemented in accordance with a preferred embodiment of the present invention. Network 300 comprises a set of computers, switches, and storage devices that may or may not participate in the communications architectures.

The Communications Architecture (CA) comprises all SAN-connected elements capable of communicating any or all of the information defined in a SAN Problem Determination Information Table (SPDIT), which is described in more detail further below.

Each SAN connected element participating in the CA is called a CA Element (CAE). Any element not participating in the CA is called a CA Non-participant (CAN). These elements are distinguished because they both participate in the SAN topology and thereby the problem determination (PD) capabilities of the system. Windows NT™ server 302, mainframe computer 304, Unix™ server 306, and Linux™ server 308 are computers that participate in the CA and are thus CAEs. Windows NT™ server 302, mainframe computer 304, and Unix server 306 are also host computers that may support various clients, which may require access to the storage devices. Each of computers 302–306 has a Host Bus Attach (HBA), which is a type of network adapter for FC hosts. FC switches 311–313 are CAEs, and some of the storage devices are also CAEs. In the example, shared RAIDs (Redundant Array of Independent Disks) 321–323 and shared tape 324 are CAEs, while shared tape 325 is a CAN.

The CA can communicate via the FC switching fabric via in-band communication links 341–352 using the TCP/IP protocol and/or via an out-of-band TCP/IP communication network on communication links 331–334 that all SAN elements share. It should be noted that the communication links depicted in FIG. 3 may be logical connections that share a single physical connection. Alternatively, the devices may be connected by more than one physical communication link.

The protocols used by the CA to issue and/or collect information are defined to be both SNMP/MIB (Simple Network Management Protocol/Management Information Base, an SNMP structure that describes the particular device being monitored) and native FC based. The use of these two protocols allows both device/host-specific and SAN-specific information to be collected and subsequently used for end-to-end problem determination.

CA Managers (CAMs) are special CAEs in which the end-to-end PD capabilities of the system reside. The SPDIT resides in the CAM and every CAE is automatically registered with a CAM (via native FC and/or SNMP services). CAEs are those elements that successfully register, and CANs are those elements that cannot register with the CAM but are known to be present via the SAN topology discovery process, which is discussed in more detail further below. CAMs support any FC Extended Link Services (ELS) that are relevant to end-to-end problem determination.

CAMs may be categorized as a primary or active CAM and secondary or inactive CAMs. CAMs are highly available elements that replicate SPDIT and registration information. For example, a secondary CAM and a primary CAM may share a heartbeat signal so that a secondary CAM, operating in a redundant manner, may assume the duties of the primary CAM if the primary CAM appears to have failed by not responding to the heartbeat signal. The problem determination interface to the CAM is comprised of a SAN PD Application Programming Interface (SAN PD API). The SAN PD API defines the communication interface between the CAM and any other operating environment that can read CAM information or status.

Figure 4:
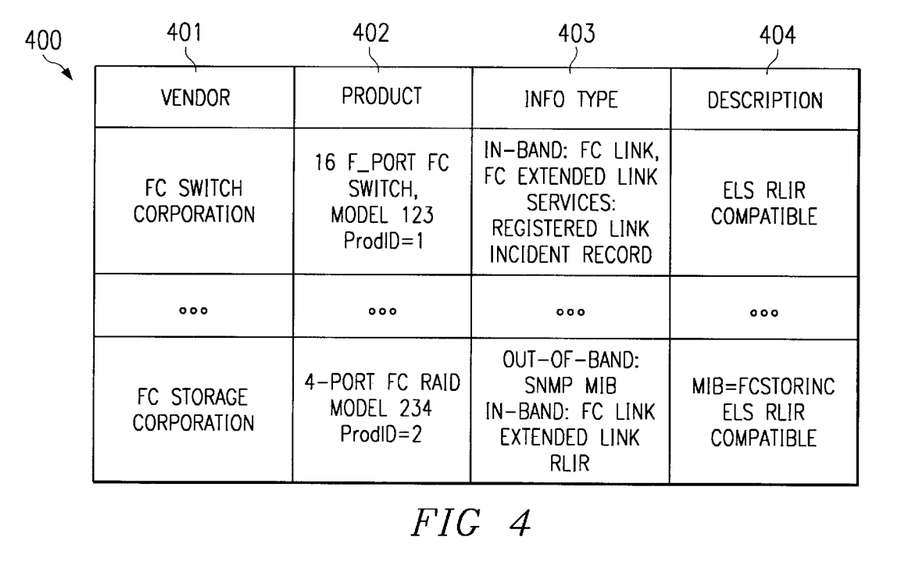
FIG. 4 is a table depicting a SAN Problem Determination Information Table (SPDIT) in accordance with a preferred embodiment of the present invention.

With reference now to FIG. 4, a table depicts a SAN Problem Determination Information Table (SPDIT) in accordance with a preferred embodiment of the present invention. The SPDIT is comprised of all known products/elements and the information types that can be communicated on the CA. The format of the SPDIT may vary depending upon the number of devices in the CA, the type of products that are supported, the information associated with the devices, etc. For example, the SPDIT would contain information concerning each device shown in FIG. 3.

SPDIT 400 may contain the following record entries: vendor attribute 401, product identifier 402, info type 403, and description 404. Each record in SPDIT 400 contains data for these record entries. Vendor attribute 401 contains the manufacturer of a particular device on the CA. Product identifier 402 contains vendor-assigned information for identifying a particular device, such as model type, model number, product serial number, etc.

Information type 403 contains data related to the type of communication links supported by the device, the format of error conditions or error definitions supported by the device, etc. Description attribute 404 provides information about the type of error information that should be expected by the product. For example, if the description attribute record only contains an indication that the product is ELS Registered Link Incident Record (RLIR) compatible, then a CAM-related process would not expect to receive out-of-band MIBs for the product.

The SPDIT will generally contain all information used to indicate status/error conditions by SAN capable peripherals, hosts, and switches. This would include native FC link and extended link error definitions, and MIB definitions. These definitions can include field replaceable unit (FRU) component information, which can be located in a MIB or embedded in the error reporting protocol and can be used to determine the granularity to which failing components can be isolated.

As noted previously, CAMs are special CAs in which the end-to-end PD capabilities of the system reside, including the SPDIT. The CAM initialization process includes the discovery and registration of all FC nodes connected to both the in-band SAN and out-of-band network. The CAM initialization process uses FC in-band and CA out-of-band (via SNMP) discovery/registration processes. This process provides a topology map (TM) of the SAN that includes all registered and non-registered SAN connected elements along with knowledge of the element types (hosts, peripherals, switches), explicit connections/paths, and their relevant vendor and SPDIT information.

Figure 5A:
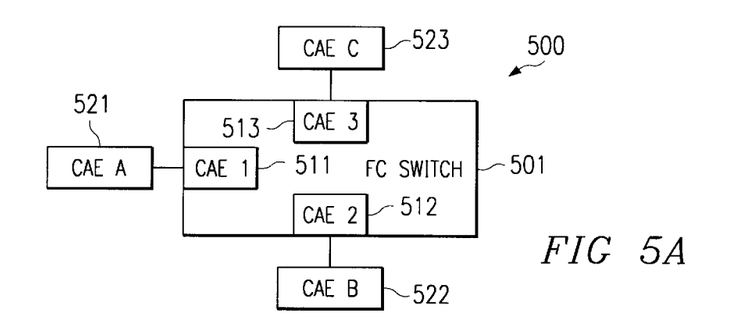
FIG. 5A is a simplified network topology diagram for a SAN.

With reference now to FIG. 5A, a simplified network topology diagram for the SAN is shown. FC switch 501 contains ports 511–513 providing connection points between FC switch 501 and CAEs 521–523, also labeled CAE A, CAE B, and CAE C. From the perspective of the CA, FC switch ports 511-513 are CAEs because the ports are capable of failing or generating errors and could be replaced after being properly diagnosed as a source of errors.

Figure 5B:
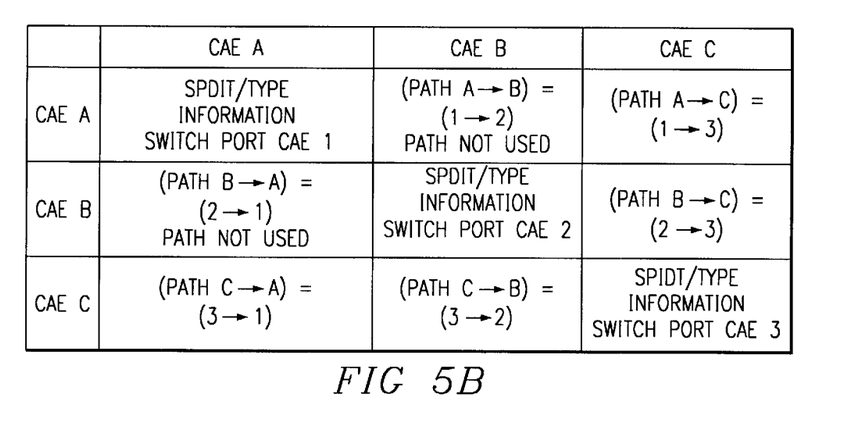
FIG. 5B is a table providing a topology map for the SAN shown in FIG. 5A.

With reference now to FIG. 5B, a table provides a topology map for the SAN shown in FIG. 5A. The TM is represented as a two-dimensional table with both the left column and the top row containing the SAN elements, both CAE and CAN devices, connected to the switch, such as FC switch 501 in FIG. 5A. The diagonal cells contain all the SPDIT/type information about the corresponding element and the switch port to which it is connected. The other cells contain the directional paths between the elements. For example, the table shows the direction path between CAE A and CAE C using the path between ports 3 and 1. Multiple paths are possible. The topology and registration discovery process are periodically repeated to ensure that the TM is current. The CAM will also register with any SAN elements providing Extended Link Services that can be used for PD.

Figure 6:
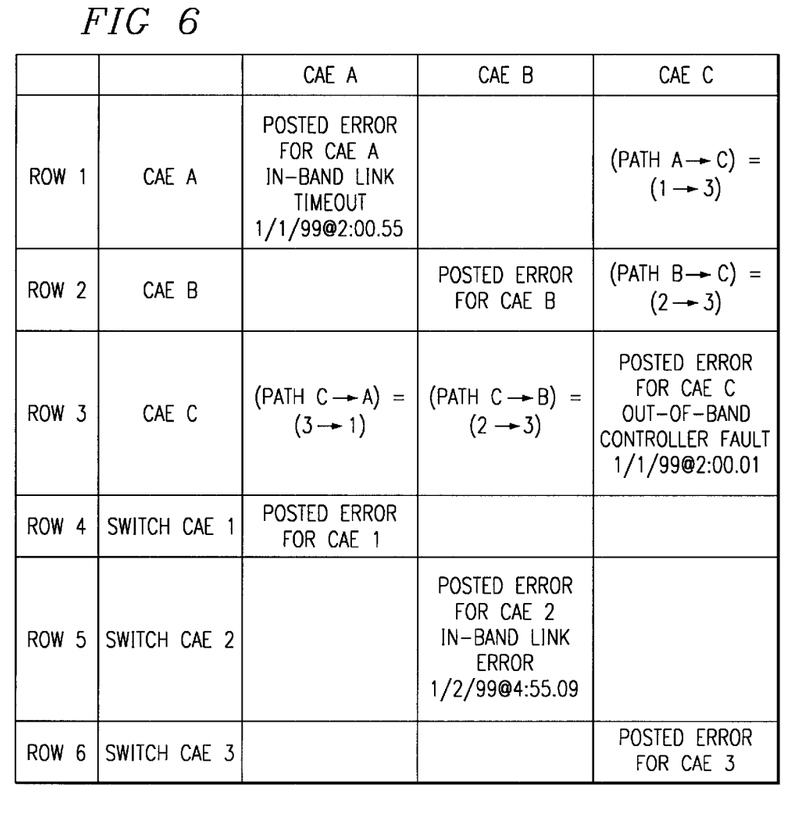
FIG. 6 is a diagram depicting a SAN Diagnostic Table for a SAN.

With reference now to FIG. 6, a diagram depicts a SAN Diagnostic Table for a SAN. The TM of a SAN is used to create a SAN Diagnostic Table (SDT) that is used for First Error Data Collection (FEDC) and Real-time Diagnostic Analysis (RDA). The SDT shown in FIG. 6 is similar to the TM shown in FIG. 5B except that it contains an extra row for each switch/fabric element.

The diagonal SDT cells are used to hold the errors reported by the CAE corresponding to its row/column, including switch ports. Each point in a path, i.e. SDT cell, represents another SAN-connected element. Each cell contains the information collected in the TM so that specific product behaviors are known and proper diagnostic decisions can be made. For example, diagnostic queries may be presented, such as whether it is more likely that a storage device is causing a link error versus a Host Bus Attach (HBA) if out-of-band SCSI device errors accompany in-band HBA FC link errors.

The exemplary error information contained in FIG. 6 illustrates the utility of RDA using the SDT. Row 1 indicates that CAE A has reported an in-band FC link timeout. Row 3 indicates an out-of-band hardware controller error on CAE C. These two errors are related because they occurred in the same time frame, as shown by the timestamps associated with the error information. Row 5 indicates that an in-band FC link error has occurred, but given the stored timestamp, the error in row 5 is unrelated to the previous two. Therefore, the table depicts two separate problems: the first is related to a controller hardware failure in CAE C, and the second is a FC Link failure on CAE 2 in the FC Switch.

Figure 7:
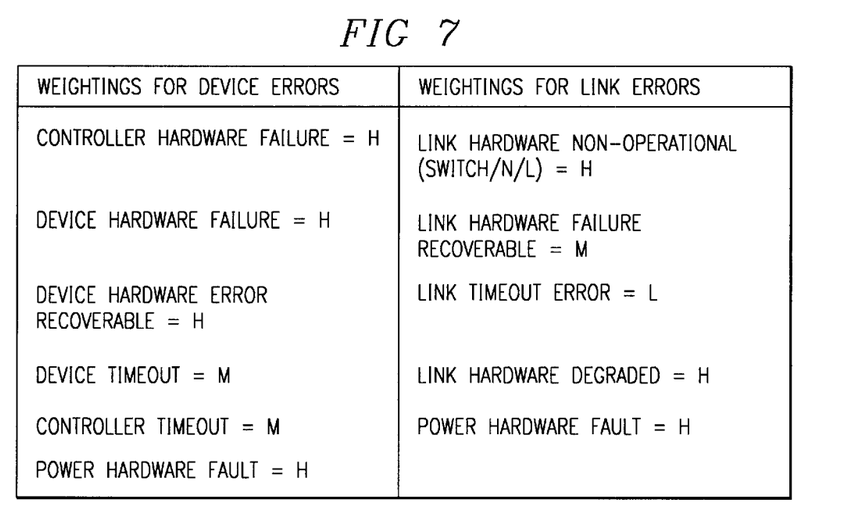
FIG. 7 is a table depicting the weightings to be used in real-time diagnostic analysis for various errors.

With reference now to FIG. 7, a table depicts the weightings to be used in real-time diagnostic analysis for various errors. The RDA algorithms traverse error reporting elements of the SDT whenever an FEDC event occurs in order to determine the appropriate response. The RDA uses weighted decision analysis in order to isolate the failing component. Two broad categories are illustrated with H=Highest, M=Middle, L=Lowest weighting.

The SDT traversal algorithms and error weightings are dynamic and would be changed to accommodate the complexity of the SAN topology and the nature of its connected elements.

The weighting table shown in FIG. 7 provides a simple illustration of the strong-to-weak weighting scale that applies to a typical SAN environment. If the SAN grows to just a few 16 port switches with its associated hosts and peripherals, the number of possible nodes that can report errors due to a single disk drive error or HBA timeout error can grow to a large number. Without global end-to-end RDA diagnostic capability, the task of isolating the failing component becomes hit-or-miss. In a multi-vendor SAN, it is common for multiple intermittent, recoverable, device errors, i.e. soft errors, to go unnoticed by the host. Eventually, the device may encounter an unrecoverable error, i.e. a hard error, that results in a system crash. The in-band and out-of-band mechanisms provided by the present invention would detect and report the recoverable errors as soon as they occur.

With reference now to FIGS. 8A–8D, flowcharts depict a process for a real-time diagnostic algorithm (RDA) for SAN end-to-end fault isolation of a single failing SAN element in accordance with a preferred embodiment of the present invention. The RDA uses two dynamic mechanisms to isolate faults:

1. Temporal Correlation Window (TCW)—The TCW is scalar value, i.e. time range, used to constrain fault isolation searching of the SDT in the time dimension so that the probability of misdiagnosis is minimized in the time dimension.

2. Spatial Correlation Path (SCP)—The SCP is a data structure that is used to constrain fault isolation searching in the spatial domain of the SDT so that only known system-to-subsystem associations are scrutinized and so that the probability of misdiagnosis is minimized in the spatial dimension. The SCP copies elements from the SDT during the RDA.

The goal of the RDA is to correlate all fault information received in time, location, and severity until the source of the fault is isolated with a high degree of certainty. This process terminates after a single reported fault or after a series of reported faults.

Figure 8A:
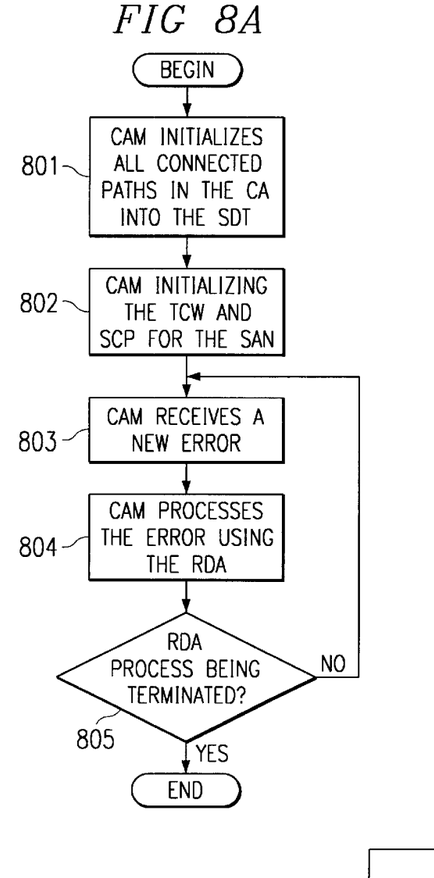
FIGS. 8A–8D are flowcharts depicting a process for a real-time diagnostic algorithm for SAN end-to-end fault isolation of a single failing SAN element in accordance with a preferred embodiment of the present invention.

The general RDA for SAN end-to-end fault isolation of a single failing SAN element is described as follows. The process begins when a CAM initializes all connected paths in the CA into the SDT (step 801). The SDT is initialized with all connected paths, i.e., paths A→B, B→C, etc. Only those paths that should be able to make connections are entered. These paths are established by the topology mapping, such as a TM similar to the TM shown in FIG. 5. The SAN may not be fully connected in order to zone off certain connections that should not be able to connect. For example, certain hosts might be restricted to storing and retrieving data on particular storage devices. A system administrator may only allow NT hosts to store data on a particular device so that a mainframe does not have the ability to corrupt or destroy the NT data.

The process continues with a CAM initializing the TCW and SCP for the SAN (step 802). The TCW is a time window and requires a time value, usually on the order from seconds to minutes. The SCP contains all sets of paths chosen from the SDT. These paths reflect known host-to-storage, host-to-host, and storage-to-storage associations that are established by the topology mapping. Again, it should be noted that a secondary CAM maintains a replica of the data structures and values that are stored in the primary CAM.

The CAM then receives a new error (step 803) and processes the error using the RDA (step 804). A determination is then made as to whether the RDA process is being terminated (step 805), and if not, the process then loops back to step 803 to receive and process more errors. If so, then the process of initializing for SAN end-to-end fault isolation is complete.

Figure 8B:
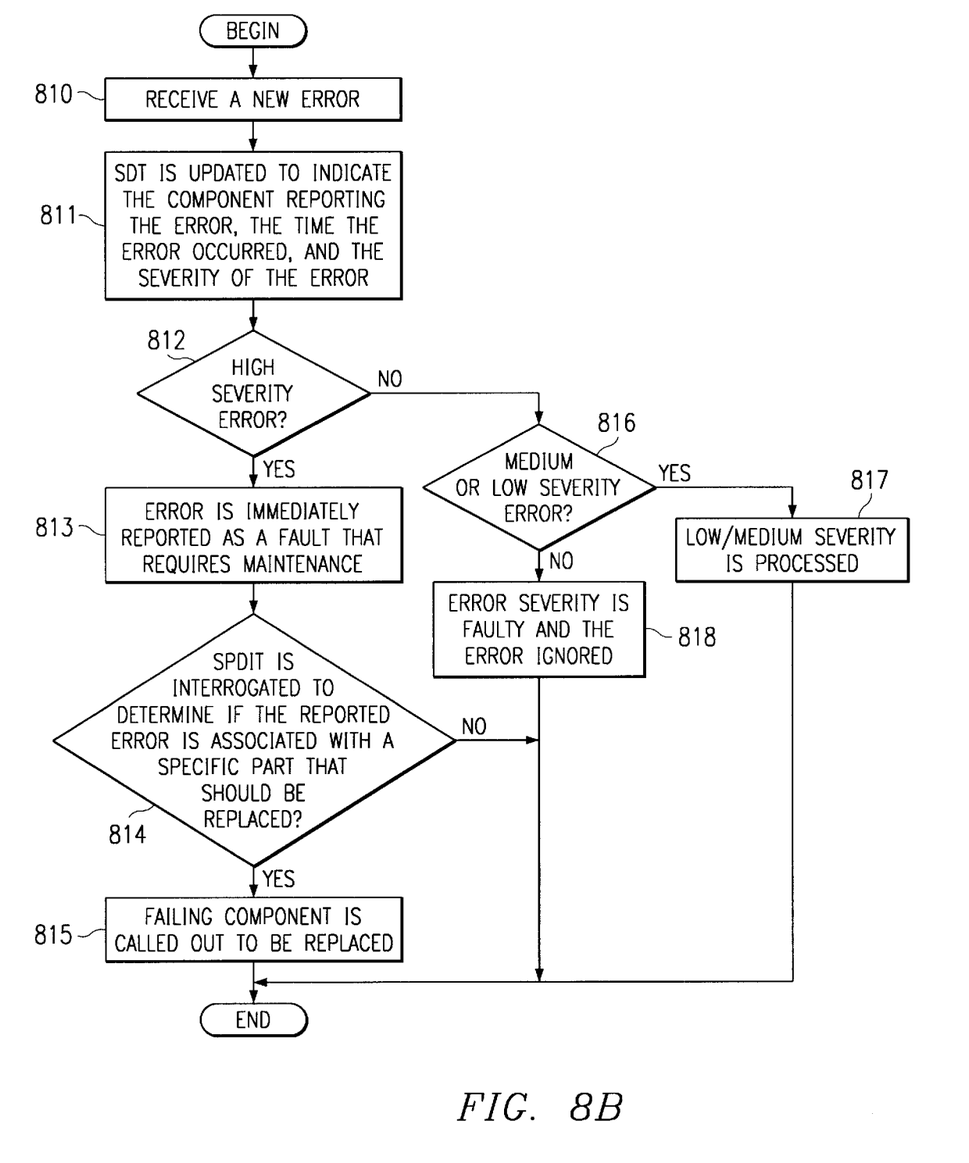

Referring now to FIG. 8B, a process depicts the processing of a new error, such as step 804 in FIG. 8A, in more detail. The process begins by receiving a new error (step 810), and the SDT is updated to indicate the component reporting the error, the time the error occurred, and the severity (high, medium, low) of the error (step 811). A determination is made as to whether the error is a high severity error (step 812). If so, then this error is immediately reported as a fault that requires maintenance (step 813). The SPDIT is then interrogated to determine if the reported error is associated with a specific part that should be replaced (step 814). If not, then the processing of the high severity error is complete. If so, then the failing component is called out to be replaced (step 815), and the processing of the high severity error is complete.

If the error is not a high severity error, then a determination is made as to whether the error is a medium or low severity error (step 816). If so, then the low/medium severity error is processed (step 817), and the error processing is complete.

If the error is neither a high severity error or a low/medium severity error, then the error severity is determined to be faulty and the error ignored (step 818).

Figure 8C:
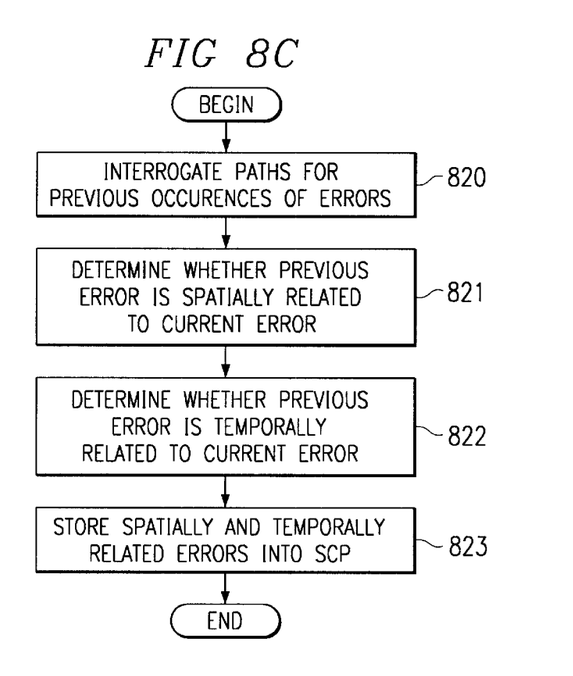

Referring now to FIG. 8C, a process depicts the processing of a new low/medium severity error, such as step 817 in FIG. 8B, in more detail. The SCP is used to determine the paths that can be affected by the reported error. Each of the SDT cells for the elements in these paths, including the element reporting the new error, are interrogated in turn for previous occurrences of errors (step 820), and it is determined if the occurrence of a previous error is spatially related to the current error (step 821). The interrogation then uses the TCW in order to determine if the occurrence of a previous error is related to the current error in time as well as space (step 822). If the previous errors are temporally and spatially related, then the errors are stored into the SCP (step 823). After the interrogation is finished, the SCP contains the mapping of all errors on the appropriate paths in the SDT that occur within the time constraint.

The manner in which the data structure for the SCP is organized and used may vary depending upon system implementation. For example, the elements from the SDT may be copied into the SCP, and as errors are determined not to be related in space or in time, the elements may be deleted from the SCP.

Figure 8D:
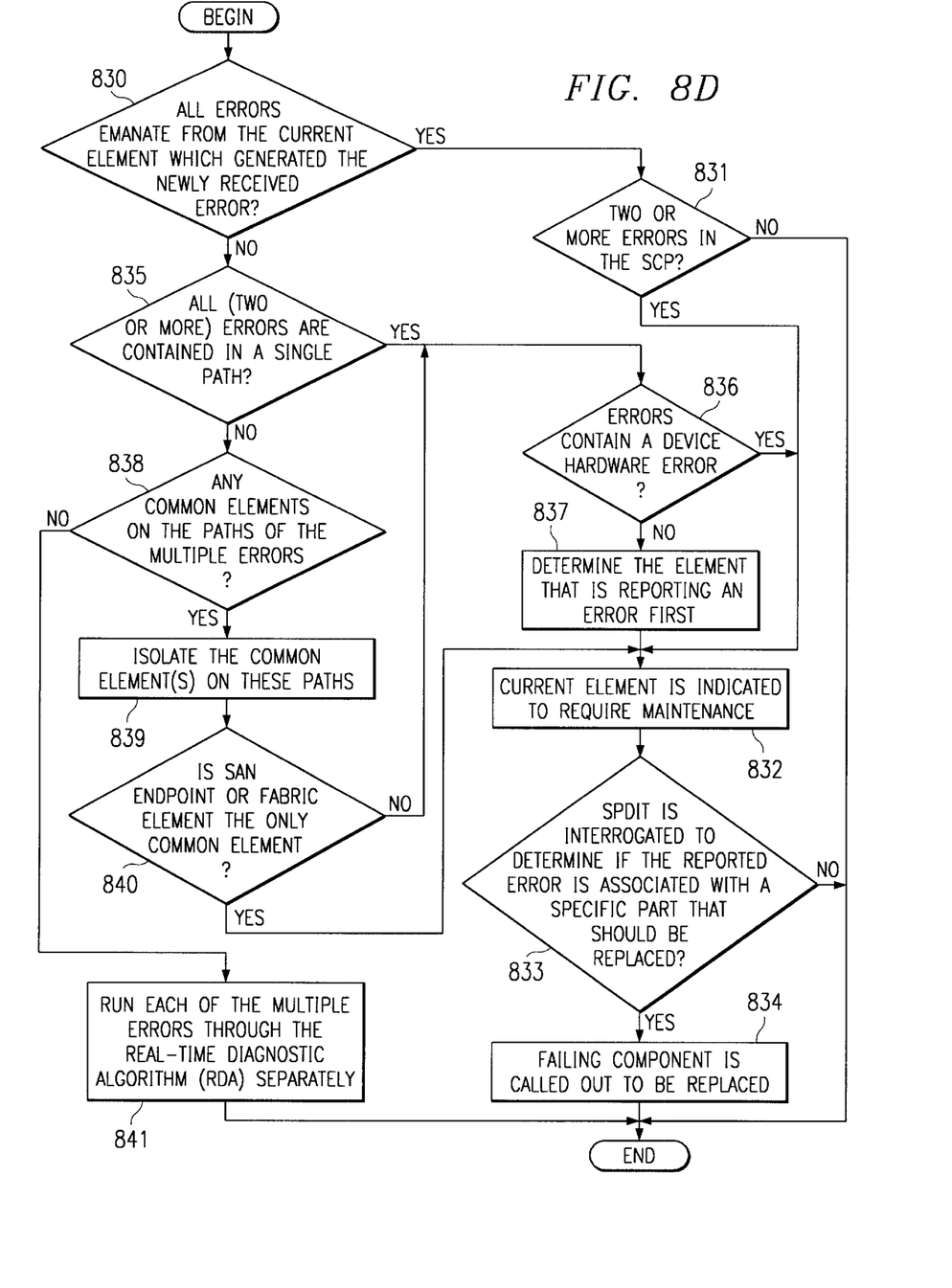

The algorithm must make an error correlation/severity assessment in order to isolate the location of the failing component. Referring now to FIG. 8D, a flowchart depicts several possible cases for failing components associated with low/medium severity errors.

The process begins with a determination of whether all errors emanate from the current element which generated the newly received error (step 830). If so, then a determination is made as to whether two or more errors are in the SCP (step 831). If not, then the processing of the current error is complete. If so, then the current element is indicated to require maintenance (step 832). The SPDIT is then interrogated to determine if the reported error is associated with a specific part that should be replaced (step 833). If so, then the failing component is called out to be replaced (step 834), and the newly received, low/medium severity error has been processed.

If all errors do not emanate from the current element, then a determination is made as to whether all (two or more) errors are contained in a single path (step 835). In this case, any element in the path may be the root cause of the reported errors, and device hardware related errors take precedence over link related or timeout related errors. A determination is made as to whether the errors contain a device hardware error (step 836). If a device hardware error is found, in a manner similar to steps 832–834 described above, the associated element is indicated to require maintenance, the SPDIT is then interrogated to determine if the reported error is associated with a specific part that should be replaced, and if so, the failing component is called out to be replaced.

If the errors on the single path do not contain a device hardware error, then only link or timeout errors are being reported. This situation can lead to degradation in performance and eventual failure of the link. In this case, the algorithm looks for the element that is reporting the error first (step 837), i.e., the first error takes precedence and the others are assumed to be related to the first occurrence. Once the element that is originating the chain of errors is found, in a manner similar to steps 832–834 described above, the associated element is indicated to require maintenance, the SPDIT is then interrogated to determine if the reported error is associated with a specific part that should be replaced, and if so, the failing component is called out to be replaced.

If two or more errors are not contained in a single path, then two or more errors are occurring on multiple paths. A determination is made as to whether there are any common elements on the paths of the multiple errors (step 838), and if so, then this case requires isolating the common element (s) on these paths (step 839) and performing an error correlation/severity assessment.

The common elements can either be SAN endpoint elements and/or SAN fabric elements. A determination is made as to whether a SAN endpoint or fabric element is the only common element (step 840). If so, then in a manner similar to steps 832–834 described above, this common element is indicated as failing and maintenance is required. The SPDIT is then interrogated to determine if the reported error is associated with a specific part that should be replaced. If so, the failing component is called out to be replaced.

Otherwise, if a SAN endpoint or fabric element is not the only common element, then both a SAN endpoint and a SAN fabric element are common. This situation is now equivalent to the result from the determination in step 835, and the process branches to step 836 for further processing.

If there are two or more errors that are not contained in a single path and there are no common elements on the paths of these errors, then each of the multiple errors are run through the real-time diagnostic algorithm (RDA) separately (step 841). This rare but possible scenario may occur when more than one error has been received within the TCW and the errors originate from separately failing components. At this point, the error process may branch back to step 804 to process each error as if each error were a newly received error.

The advantages of the present invention are apparent in view of the detailed description of the invention provided above. A SAN Diagnostic Table is created using the SAN topology, native Fibre Channel services, and vendor specific information. The present invention supports both FC native in-band and host/device specific out-of-band status/error data collection for SAN problem determination. A real-time diagnostic algorithm may then traverse the SAN Diagnostic Table to isolate a failing SAN component. The methodology is advantageous because it may be implemented on host operating environments such that special access to management terminals or device diagnostics are not required to isolate failing components. In addition, the methodology is platform-independent, and it supports both FC native in-band and host/device-specific out-of-band status/error data collection for SAN problem determination.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing errors within a storage area network (SAN), the method comprising the computer implemented steps of:

generating a SAN topology map comprising a table in which each row of the SAN topology table is uniquely mapped to a communication architecture element (CAE) and each column of the SAN topology table is uniquely mapped to the CAE, wherein the CAE is a network-connected device that has successfully registered with a communications architecture manager (CAM) via a network service protocol, wherein the CAM contains problem determining (PD) functionality for the SAN and maintains the SPDIT;

generating a SAN problem determination information table (SPDIT); and generating a SAN diagnostic table (SDT) using the SAN topology map and the SPDIT.

2. The method of claim 1 wherein a communication architecture (CA) comprises all network-connected elements capable of communicating information stored in the SPDIT, and wherein the SPDIT comprises at least one data record associated with each product or element on the CA.

3. The method of claim 2 wherein at least one data record associated with each product or element on the CA further comprises one or more data items selected from the group consisting of:

product vendor information; product identifier information; information concerning a type of communication link supported by the product or element; and/or information concerning a type of error information to be reported by the product or element.

4. The method of claim 3 wherein the type of error information indicates whether the product or element supports Extended Link Services (ELS) Registered Link Incident Record (RLIR).

5. The method of claim 3 wherein the SDT stores information from the SAN topology map and errors received by the CAM from CAEs.

6. A method for processing errors within a storage area network (SAN), the method comprising the computer-implemented steps of:

receiving an error message at a communication architecture manager (CAM), wherein the CAM comprises problem determination (PD) functionality for the SAN, wherein a CAM maintains a SAN PD information table (SPDIT), and wherein a communication architecture (CA) managed by the CAM comprises all network-connected elements capable of communicating information stored in the SPDIT;

generating a SAN topology map comprising a table in which each row of the SAN topology tables uniquely mapped to a communication architecture element (CAE) and each column of the SAN topology table is uniquely mapped to the CAE, wherein the CAE is a network-connected device that has successfully registered with the communications architecture manager (CAM) via a network service protocol, wherein the CAM contains problem determination (PD) functionality for the SAN and maintains the SPDIT; and processing the error message using a real-time diagnostic algorithm (RDA).

7. The method of claim 6 wherein a network supporting the CA comprises in-band Fibre Channel communication links and out-of-band communication links.

8. The method of claim 6 wherein the SAN further comprises:

a plurality of storage devices connected to the network; and a plurality of host computers connected to the network, wherein at least one of the plurality of host computers comprises a CAM;

wherein at least some of the error messages are generated by at least some of the plurality of storage devices and host computers.

9. The method of claim 6 further comprising:

map;

generating a SAN diagnostic table (SDT) using the SAN topology map and the SPDIT.

10. The method of claim 9 further comprising:
  analyzing the received error message using a temporal correlation window (TCW) value to temporally constrain fault isolation determination while searching for temporally-related error messages previously received by the CAM and stored within the SDT; and
  analyzing the received error message using a spatial correlation path data structure (SCP) to spatially constrain fault isolation determination while searching for spatially-related error messages previously received by the CAM and stored within the SDI.

11. The method of claim 10 further comprising:
  analyzing the received error message using error severity weightings according to a type of error indicated by the received error message.

12. A data processing system for communicating error information in a storage area network (SAN), the data processing system comprising:
  a network comprising in-band Fibre Channel communication links and out-of-band communication links, wherein the network supports a communications architecture (CA);
  a plurality of storage devices connected to the network;
  a plurality of host computers connected to the network, wherein at least one of the plurality of host computers comprises a communications architecture manager (CAM) containing problem determination (PD) functionality, wherein a CAM maintains a SAN PD information table (SPDIT), and wherein the CA comprises all network-connected elements capable of communicating information stored in the SPDIT, and wherein the at least one of the plurality of host computer systems includes a SAN topology map comprising a table in which each row of the SAN topology table is uniquely mapped to a communication architecture element (CAE) and each column of the SAN topology table is uniquely mapped to the CAE, wherein the CAE is a network-connected device that has successfully registered with the communications architecture manager (CAM) via a network service protocol, wherein the CAM contains problem determination (PD) functionality for the SAN and maintains the SPDIT.

13. The data processing system of claim 12 further comprising:
  a plurality of CAMs, wherein the CA comprises a primary CAM and one or more secondary CAMs, wherein a secondary CAM operates redundantly for a primary CAM.

14. The data processing system of claim 12 wherein the CA further comprises one or more CA elements (CAEs) and one or more CA non-participants (CANs), wherein a CAE is a network-connected device that has successfully registered with a CAM via a network service protocol, and wherein a CAN is a network-connected device that has not registered with a CAM yet known to be present via a SAN topology discovery process.

15. The data processing system of claim 12 wherein the in-band Fibre Channel communication links and the out-of-band communication links are provided by a single, physical communication link.

16. A data processing system for processing errors within a storage area network (SAN), the data processing system comprising:
  first generating means for generating a SAN topology map comprising a table in which each row of the SAN topology table is uniquely mapped to a communication architecture element (CAE) and each column of the SAN topology table is uniquely mapped to the CAE, wherein the CAE is a network-connected device that has successfully registered with a communications architecture manager (CAM) via a network service protocol, wherein the CAM contains problem determination (PD) functionality for the SAN and maintains the SPDIT;
  second generating means for generating a SAN problem determination information table (SPDIT); and
  third generating means for generating a SAN diagnostic table (SDT) using the SAN topology map and the SPDIT.

17. The data processing system of claim 16 wherein a communication architecture (CA) comprises all network-connected elements capable of communicating information stored in the SPDIT, and wherein the SPDIT comprises at least one data record associated with each product or element on the CA.

18. The data processing system of claim 17 wherein at least one data record associated with each product or element on the CA further comprises one or more data items selected from the group consisting of: product vendor information; product identifier information; information concerning a type of communication link supported by the product or element; and/or information concerning a type of error information to be reported by the product or element.

19. The data processing system of claim 18 wherein the type of error information indicates whether the product or element supports Extended Link Services (ELS) Registered Link Incident Record (RLIR).

20. The data processing system of claim 18 wherein the SDT stores information from the SAN topology map and errors received by the CAM from CAEs.

21. A data processing system for processing errors within a storage area network (SAN), the data processing system comprising:
  receiving means for receiving an error message at a communication architecture manager (CAM), wherein the CAM comprises problem determination (PD) functionality for the SAN, wherein a CAM maintains a SAN PD information table (SPDIT), and wherein a communication architecture (CA) managed by the CAM comprises all network-connected elements capable of communicating information stored in the SPDIT;
  generating means for generating a SAN topology map comprising a table in which each row of the SAN topology table is uniquely mapped to a communication architecture element (CAE) and each column of the SAN topology table is uniquely mapped to the CAE, wherein the CAE is a network-connected device that has successfully registered with the communications architecture manager (CAM) via a network service protocol, wherein the CAM contains problem determination (PD) functionality for the SAN and maintains the SPDIT; and
  processing means for processing the error message using a real-time diagnostic algorithm (RDA).

22. The data processing system of claim 21 wherein a network supporting the CA comprises in-hand Fibre Channel communication links and out-of-band communication links.

23. The data processing system of claim 21 wherein the SAN further comprises:

a plurality of storage devices connected to the network; and a plurality of host computers connected to the network, wherein at least one of the plurality of host computers comprises a CAM;

wherein at least some of the error messages are generated by at least some of the plurality of storage devices and host computers.

24. The data processing system of claim 21 further comprising:

generating means for generating a SAN diagnostic table (SDT) using the SAN topology map and the SPDIT.

25. The data processing system of claim 24 further comprising:

first analyzing means for analyzing the received error message using a temporal correlation window (TCW) value to temporally constrain fault isolation determination while searching for temporally-related error messages previously received by the CAM and stored within the SDT; and second analyzing means for analyzing the received error message using a spatial correlation path data structure (SCP) to spatially constrain fault isolation determination while searching for spatially-related error messages previously received by the CAM and stored within the SDT.

26. The data processing system of claim 25 further comprising:

third analyzing means for analyzing the received error message using error severity weightings according to a type of error indicated by the received error message.

27. A computer program product in a computer-readable medium for use in a data processing system for processing errors within a storage area network (SAN), the computer program product comprising:

first instructions for generating a SAN topology map comprising a table in which each row of the SAN topology table is uniquely mapped to a communication architecture element (CAE) and each column of the SAN topology table is uniquely mapped to the CAE, wherein the CAE is a network-connected device that has, successfully registered with a communications architecture manager (CAM) via a network service protocol, wherein the CAM contains problem determination (PD) functionality for the SAN and maintains the SPDIT;

second instructions for generating a SAN problem determination information table (SPDIT); and third instructions for generating a SAN diagnostic table (SDT) using the SAN topology map and the SPDIT.

28. A computer program product in a computer-readable medium for use in a data processing system for processing errors within a storage area network (SAN), the computer program product comprising:

first instructions for receiving an error message at a communication architecture manager (CAM), wherein the CAM comprises problem determination (PD) functionality for the SAN, wherein a CAM maintains a SAN PD information table (SPDIT), and wherein a communication architecture (CA) managed by the CAM comprises all network-connected elements capable of communicating information stored in the SPDIT; and second instructions for generating a SAN topology map comprising a table in which each row of the SAN topology table is uniquely mapped to a communication architecture element (CAE) and each column of the SAN topology table is uniquely mapped to the CAE, wherein the CAE is a network-connected device that has successfully registered with the communications architecture manager (CAM) via a network service protocol wherein the CAM contains problem determination (PD) functionality for the SAN and maintains the SPDIT; and third instructions for processing the error message using a real-time diagnostic algorithm (RDA).

* * * * *

UNITED STATES PATENT AND TRADEMARK OFFICE
CERTIFICATE OF CORRECTION

PATENT NO. : 6,636,981 B1  Page 1 of 1
APPLICATION NO. : 09/478306
DATED : October 21, 2003
INVENTOR(S) : Barnett et al.

It is certified that error appears in the above-identified patent and that said Letters Patent is hereby corrected as shown below:

Col. 10, line 38: after "tables" insert --is--.

Col. 10, line 63: delete "map;".

Col. 11, line 11: delete "SDI" and insert --SDT--.

Col. 14, line 3: after "has" delete ",".

Col. 14, line 24: after "SPDIT;" delete "and".

Col. 14, line 33: after "protocol" insert --,--.

Signed and Sealed this

Eleventh Day of July, 2006

JON W. DUDAS
*Director of the United States Patent and Trademark Office*